(12) United States Patent
Chiu et al.

(10) Patent No.: US 9,395,728 B2
(45) Date of Patent: Jul. 19, 2016

(54) CHARGE PUMP DEVICE AND DRIVING CAPABILITY ADJUSTMENT METHOD THEREOF

(75) Inventors: Hsiang-Yi Chiu, New Taipei (TW); Zhen-Guo Ding, Tainan (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 27 days.

(21) Appl. No.: 13/517,604

(22) Filed: Jun. 14, 2012

(65) Prior Publication Data
US 2013/0222051 A1 Aug. 29, 2013

(30) Foreign Application Priority Data
Feb. 24, 2012 (TW) .............................. 101106208 A

(51) Int. Cl.
| | |
|---|---|
| G05F 1/10 | (2006.01) |
| H02M 3/07 | (2006.01) |
| H02M 1/14 | (2006.01) |
| H02M 1/36 | (2007.01) |
| H02M 1/00 | (2006.01) |
| H02M 1/32 | (2007.01) |

(52) U.S. Cl.
CPC . *G05F 1/10* (2013.01); *H02M 1/14* (2013.01); *H02M 3/07* (2013.01); *H02M 1/32* (2013.01); *H02M 1/36* (2013.01); *H02M 2001/0012* (2013.01)

(58) Field of Classification Search
CPC ........... G02M 3/07; H02M 1/36; H02M 1/14; H02M 1/32; H02M 2001/0012; G11C 5/145; G05F 1/10

USPC ......... 327/536, 530, 538, 540, 534, 535, 537, 327/543
See application file for complete search history.

(56) References Cited

U.S. PATENT DOCUMENTS

| | | | | |
|---|---|---|---|---|
| 6,154,411 | A * | 11/2000 | Morishita | 365/226 |
| 6,285,622 | B1 * | 9/2001 | Haraguchi et al. | 365/226 |
| 6,320,457 | B1 * | 11/2001 | Yang | 327/536 |
| 6,320,796 | B1 | 11/2001 | Voo | |
| 6,414,881 | B1 * | 7/2002 | Fujii et al. | 365/189.09 |
| 7,443,230 | B2 * | 10/2008 | Chen et al. | 327/535 |
| 2002/0084833 | A1 * | 7/2002 | Kim et al. | 327/536 |
| 2005/0168263 | A1 * | 8/2005 | Fukuda et al. | 327/535 |
| 2008/0054991 | A1 * | 3/2008 | Maejima | 327/536 |
| 2008/0304349 | A1 * | 12/2008 | Suzuki et al. | 365/226 |

(Continued)

FOREIGN PATENT DOCUMENTS

| | | |
|---|---|---|
| CN | 1466807 A | 1/2004 |
| CN | 1591115 A | 3/2005 |

(Continued)

*Primary Examiner* — Jung Kim
(74) *Attorney, Agent, or Firm* — Winston Hsu; Scott Margo

(57) ABSTRACT

A charge pump device is disclosed. The charge pump device includes a driving stage, for generating a driving signal corresponding to a driving capability; a charge pump circuit, for generating an output voltage according to the driving signal; a comparing circuit, comprising a first comparator for comparing the output voltage and a first reference voltage to generate a first comparing result; an overload detection circuit, for generating a detection result according to at least one of the first comparing result and the output voltage; and a driving capability control circuit, coupled between the overload detection circuit and the driving stage for controlling the driving capability corresponding to the driving signal according to the detection result.

12 Claims, 10 Drawing Sheets

(56) References Cited

U.S. PATENT DOCUMENTS

| | | | |
|---|---|---|---|
| 2010/0097127 A1* | 4/2010 | Maejima | 327/536 |
| 2010/0237930 A1* | 9/2010 | Byeon | 327/536 |
| 2011/0140766 A1* | 6/2011 | Maejima | 327/534 |
| 2012/0133425 A1* | 5/2012 | Maejima | 327/536 |
| 2014/0055187 A1* | 2/2014 | Chen et al. | 327/306 |

FOREIGN PATENT DOCUMENTS

| | | |
|---|---|---|
| CN | 101546955 A | 9/2009 |
| CN | 101667774 A | 3/2010 |
| TW | 200818672 | 4/2008 |
| TW | 200826448 | 6/2008 |

* cited by examiner

US 9,395,728 B2

1

CHARGE PUMP DEVICE AND DRIVING CAPABILITY ADJUSTMENT METHOD THEREOF

BACKGROUND OF THE INVENTION

1. Field of the Invention

The present invention relates to a charge pump device and driving capability adjustment method thereof, and more particularly, to a charge pump device and driving capability adjustment method thereof capable of adjusting an output driving capability according to loading status while balancing both output ripple and loading affording capability.

2. Description of the Prior Art

Generally speaking, a charge pump device can be utilized for providing a stable output voltage to different loadings. In the prior art, the charge pump device is controlled by an operational amplifier or by a comparator. Under the structure utilizing the operational amplifier for performing controlling, the output voltage has smaller output ripples but may be unstable under different loadings and different external components. Although the output voltage is stable under the structure utilizing the comparator for controlling, the output voltage has greater periodic output ripples and may have noise in audio frequency band under certain loadings.

For example, please refer to FIG. 1A, which is a schematic diagram of a conventional charge pump device 10. The charge pump device 10 is realized in the structure utilizing the operational amplifier for performing controlling, and comprises a charge pump circuit 102, an operation amplifier 104, an adjusting transistor 106 and a driving stage 108. In brief, the charge pump circuit 102 generates an output voltage VGH according to a driving signal DRVP generated by the driving stage 108. For example, the charge pump circuit 102 may be a Dickson charge pump which controls an input voltage AVDD to charge flying capacitors CF1 and CF2 when the driving signal DRVP is at a low logic level, such that the charges stored in the flying capacitor CF1 and CF2 are outputted to an output capacitor CS1 when the driving signal DRVP is at a high logic level for sharing charges of the flying capacitor CF1 and CF2, to pump the output voltage VGH to a desired voltage level.

As to generating the driving signal DRVP for performing controlling, the voltage dividing resistors R1 and R2 divide the output voltage VGH for generating a feedback voltage FBP to the operational amplifier 104. The operational amplifier 104 compares the feedback voltage FBP and a reference voltage VREF to provide an output signal OP_OUT to the adjusting transistor 106 for performing adjusting the driving capability. Specifically, the feedback voltage FBP becomes higher and the output signal OP_OUT is also pulled high when the output voltage VGH becomes higher, such that the conducting resistance of the adjusting transistor 106 becomes greater (i.e. the gate-source voltage of the adjusting transistor 106 becomes smaller); and the feedback voltage FBP becomes lower and the output signal OP_OUT is pulled low when the output voltage VGH becomes lower, such that the conducting resistance of the adjusting transistor 106 becomes smaller (i.e. the gate-source voltage of the adjusting transistor 106 becomes smaller). Next, the driving stage 108 generates the driving signal DRVP according to the adjusting transistor 106 and a clock signal CLK, for controlling the charge pump circuit 102 to generate the desired output voltage VGH.

In detail, please refer to FIG. 1B, which is a waveform diagram of related signals of charge pump device 10 shown in FIG. 1A. As shown in FIG. 1B, since the driving stage 108 continuously triggers the driving signal DRVP to a high logic level when the clock signal CLK is at a high logic level and the conducting resistance of the adjusting transistor 106 is adjusted according to the output voltage VGH, a smaller charging current of the charge pump circuit 102 generated to the output voltage VGH of the output capacitor CS1 is obtained. Since the ripples of the output voltage VGH are proportional to the charging current, the output voltage VGH therefore has smaller output ripples.

However, since the output of the charge pump device 10 has a pole equals 1/(2π×CS1×loading resistance), the pole varies due to different external loadings and different capacitances of output capacitor CS1, causing the charge pump 10 to be unstable under certain circumstances.

On the other hand, please refer to FIG. 2A, which is a schematic diagram of another conventional charge pump device 20. The charge pump device 20 is partially similar to the charge pump device 10, and thus the same symbols are used for components and signals with similar functions. The charge pump device 20 is controlled by a comparator, and comprises a charge pump circuit 102, a comparing circuit 204, a driving stage 206 and voltage dividing resistors R1 and R2, wherein the comparing circuit 204 comprises a comparator 208, a flip-flop 210 and a NAND gate 212. The operations of the charge pump device 102 pumps the output voltage VGH to the desired level according to the driving signal DRVP generated the driving stage 206 can be referred to the above, and are not narrated herein for brevity.

As to generation of the driving signal DRVP for performing controlling, the voltage dividing resistors R1 and R2 divide the output voltage VGH for generating the feedback voltage FBP to the comparator 208. The comparator 208 compares the feedback voltage FBP and the reference voltage VREF for providing a comparing output signal COMP_OUT, and the flip-flop 210 samples the voltage level of the comparing output signal COMP_OUT at the rising edges of the clock signal CLK and provides a comparing sample signal COMP_SAM (i.e. different from the comparing output signal COMP_OUT which may vary due to noise or interference, the comparing sample signal COMP_SAM stays at the same level during a time period of the clock signal CLK). The NAND gate 212 generates a comparing result signal COMP_SIG to the driving stage 206, such that the driving stage 206 can accordingly toggle the driving signal DRVP for controlling the charge pump circuit 102 to generate the desired output voltage VGH.

In detail, please refer to FIG. 2B, which is a waveform diagram of related signals of the charge pump device 20 shown in FIG. 2A. As shown in FIG. 2B, when the output voltage VGH is lower than a target voltage (i.e. the feedback voltage FBP is smaller than the reference voltage VREF), the comparing sample signal COMP_SAM starts outputting a high logic level for a period starting at a rising edge of the clock signal CLK. When both the comparing sample signal COMP_SAM and the clock signal CLK are at the high logic level (i.e. the comparing result signal COMP_SIG is at the low logic level), the driving signal DRVP is at the high logic level for controlling the charge pump circuit 102 to continuously charge the output voltage VGH. Next, after the output voltage VGH becomes greater than the target voltage, the comparing sample signal COMP_SAM outputs a low logic level for a period starting at another rising edge of the clock signal CLK, to keep the driving signal DRVP at the low logic level for controlling the charge pump device 102 not to charge the output voltage VGH. The output voltage VGH of the output capacitor CS1 is gradually decreased in driving the external loading. The above operations proceed repeatedly until the output voltage VGH is lower than the target voltage.

In such a condition, since the charge pump device 20 only compares the feedback voltage FBP and the reference voltage VREF, the output voltage VGH is stable under different loading and capacitor CS1 conditions.

On the other hand, in comparison with the charge pump device 10 triggering the driving signal DRVP to the high logic level when the clock signal CLK is at the high logic level, the charge pump device 20 triggers the driving signal DRVP to high logic level only when both the comparing sample signal COMP_SAM and the clock signal CLK are at the high logic level (the driving signal DRVP is selectively triggered), such that a larger charging current of the charge pump circuit 102 is obtained, leading to larger output ripples.

In detail, the level of the high logic level of the driving signal DRVP relates to the driving capability corresponding to the driving signal DRVP. In the structure of comparator, since the transistors of driving stage 206 are turned fully on, the level of the driving signal DRVP is higher when the driving signal is at the high logic level. On the contrary, in the structure of the operational amplifier, since the output signal OP OUT of the operational amplifier 104 adjusts the driving capability of the driving stage 108 via adjusting the transistor 106, the level of the driving signal DRVP is lower when the driving signal DRVP is at the high logic level. The driving capability provided by the charge pump circuit 102 is determined by the number of times the driving signal DRVP is triggered to the high logic level and the amplitude of the driving signal DRVP. For different loadings, the comparator structure adjusts the number of times the driving signal DRVP is triggered to the high logic level, while the operational amplifier structure adjusts the amplitude of the driving signal DRVP when the driving signal DRVP is at the high logic level.

When the system is stable, the average charging current of the charge pump circuit 102 for charging the output voltage VGH must equal the loading current, such that the output voltage VGH can be kept at the target level. For the same the loading current, since the driving signal DRVP in the operational amplifier structure is kept toggling while the one in the comparator structure toggles periodically, the charging current of the charge pump circuit 102 in the comparator structure us larger than that in the operational amplifier structure. Furthermore, the output ripples are proportional to the charging current, so the output voltage VGH of the comparator structure therefore has greater periodic output ripple.

In such a condition, although the charge pump device 20 controlled by the comparator does not have problem of stability, the charge pump device 20 has larger output ripples. If the output ripples are reduced via decreasing the driving capability of the driving signal DRVP, the loading driving capability is also decreased, such that the charge pump device 20 may not appropriately drive the loading.

SUMMARY OF THE INVENTION

A charge pump device is provided capable of adjusting driving capability according to loading status and simultaneously balancing performance of both the output ripple and loading driving capability and a driving capability adjustment method thereof.

In an aspect, a charge pump device is provided. The charge pump device comprises a driving stage, for generating a driving signal corresponding to a driving capability; a charge pump circuit, for generating an output voltage according to the driving signal; a comparing circuit, comprising a first comparator for comparing the output voltage and a first reference voltage to generate a first comparing result; an overload detection circuit, for generating a detection result according to at least one of the first comparing result and the output voltage; and a driving capability control circuit, coupled between the overload detection circuit and the driving stage for controlling the driving capability corresponding to the driving signal according to the detection result.

In another aspect, a charge pump device is provided. The charge pump device comprises a driving stage, comprising a control input terminal, a driving input terminal and a driving output terminal; a charge pump circuit, comprising an input terminal coupled to the driving output terminal of the driving stage, and an output terminal; a comparing circuit, comprising a first comparator which comprises an input terminal coupled to the output terminal of the charge pump circuit and an output terminal coupled to the driving input terminal of the driving stage; an overload detection circuit, comprising at least one detection input terminal coupled to one of the output terminals of the comparing circuit and the output terminal of the charge pump circuit, and one or more detection output terminal; and a driving capability control circuit, coupled between the one or more detection output terminal and the control input terminal.

In another aspect, a charge pump adjustment method for a charge pump device is provided. The charge pump adjustment method comprises setting a driving capability for driving the charge pump device according to whether an output voltage of the charge pump device reaches a target voltage in an startup period; and repeating following steps during an operation period after the startup period: (i)setting the driving capability according to whether the output voltage does not maintain at the target voltage; and (ii)setting the driving capability according to whether the output voltage reaches the target voltage.

In another aspect, a charge pump adjustment method for a charge pump device is provided. The charge pump adjustment method comprises (i) utilizing a specific driving capability for driving to generate the output voltage when an output voltage does not maintain at a target voltage; and (ii) utilizing a driving capability corresponding to the number of times the output voltage has not maintained at the target voltage for driving to generate the output voltage when the output voltage reaches the target voltage.

These and other objectives of the present invention will no doubt become obvious to those of ordinary skill in the art after reading the following detailed description of the preferred embodiment that is illustrated in the various figures and drawings.

DETAILED DESCRIPTION

In embodiments of the present invention, charge pump devices and driving capability adjustment method thereof adjust the driving capability of the driving stage via detecting whether the output stage of the charge pump device maintains at a target voltage and the number of times the output voltage has not maintained at the target voltage, and accordingly output the output voltage having minimum ripple and affording loading. The present invention is particularly shown and described with respect to at least one exemplary embodiment accompanied with drawings. Words utilized for describing connection between two components such as couple and connect should not be taken as limiting a connection between the two components to be directly coupling or indirectly coupling.

Figure 3A:
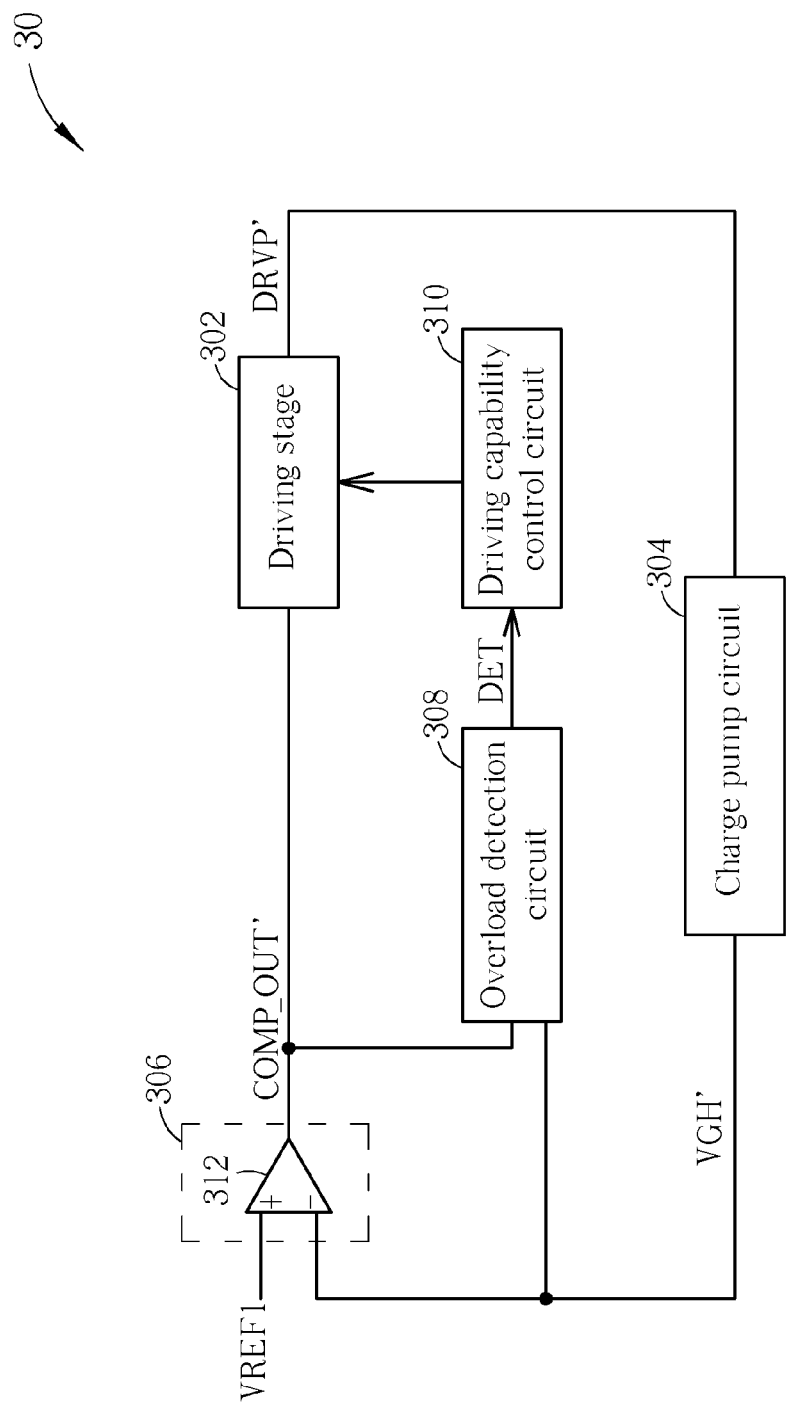
FIG. 3A is a schematic diagram of a charge pump device according to an embodiment of the present invention.

Please refer to FIG. 3A, which is a schematic diagram of a charge pump device 30 according to an embodiment. As shown in FIG. 3A, the charge pump device 30 comprises a driving stage 302, a charge pump circuit 304, a comparing circuit 306, an overload detection circuit 308 and a driving capability control circuit 310.

Simply speaking, the driving stage 302 comprises a control input terminal, a driving input terminal, and a driving output terminal, for generating a driving signal DRVP' corresponding to a driving capability. The charge pump circuit 304 comprises an input terminal coupled to the driving output terminal of the driving stage 302, an output terminal for generating an output voltage VGH' according to the driving signal DRVP'. The comparing circuit 306 comprises a comparator 312 comprising an input terminal coupled to the output terminal of the charge pump circuit 304, and an output terminal coupled to the driving input terminal of the driving stage 302. The comparator 312 compares the output voltage VGH' and a reference voltage VREF1 for generating a comparing signal COMP_OUT'.

The overload detection circuit 308 comprises at least one detection input terminal coupled to one of the output terminal of the comparing circuit 306 and the output terminal of the charge pump circuit 304 (ex. one of the at least one detection input terminal is directly coupled to the output terminal of the comparator 312 as shown in FIG. 3A), and one or more detection output terminal for generating a detection result DET according to at least one of the comparing signal COMP_OUT' and the output voltage VGH'.

The driving capability control circuit 310 is coupled between the one or more detection output terminal of the overload detection circuit 308 and the control input of the driving stage 302, for controlling the driving capability corresponding to the driving signal DRVP' according to the detection result DET. Generally, the driving capability control circuit 310 adjusts the driving capability corresponding to the driving signal DRVP' by adjusting the number of times utilizing the driving signal DRVP' drives the charge pump circuit 304 to continuously charging, adjusting the sizes of transistors generating the driving signal DRVP', or connecting different numbers of transistors in parallel for generating the driving signal DRVP'.

In the above configuration, the charge pump device 30 can generate the detection result DET according to the output voltage VGH', and then accordingly control the driving capability corresponding to the driving signal DRVP'. The charge pump device 30 therefore can balance performance of both output ripple and the loading driving capability, and the output of which is stable due to controlling by the comparator.

In detail, the detection result DET indicates whether the output voltage VGH' reaches a target voltage and whether the output voltage VGH' does not maintain at the target voltage. When the detection result DET indicates the output voltage VGH' does not maintain at the target voltage, the driving capability is insufficient for driving current loading such that the output voltage VGH' cannot reach the target voltage for a long period or the output voltage VGH' is much lower than the target voltage. Therefore, the driving capability control circuit 310 increases the driving capability corresponding to the driving signal DRVP' to a specific driving capability, such as the strongest driving capability among a plurality of driving capabilities provided by the driving stage 302, to rapidly increase the output voltage VGH' to the target voltage.

Next, after the output voltage VGH' reaches the target voltage by the driving capability control circuit 310 setting the driving capability to the specific driving capability, the driving capability control circuit 310 can decrease the driving capability and the decreased driving capability is determined by the number of times the output voltage VGH' has not maintained at the target voltage, wherein the driving capability can be set stronger for a larger number of times the output voltage VGH' has not maintained at the target voltage.

Figure 3B:
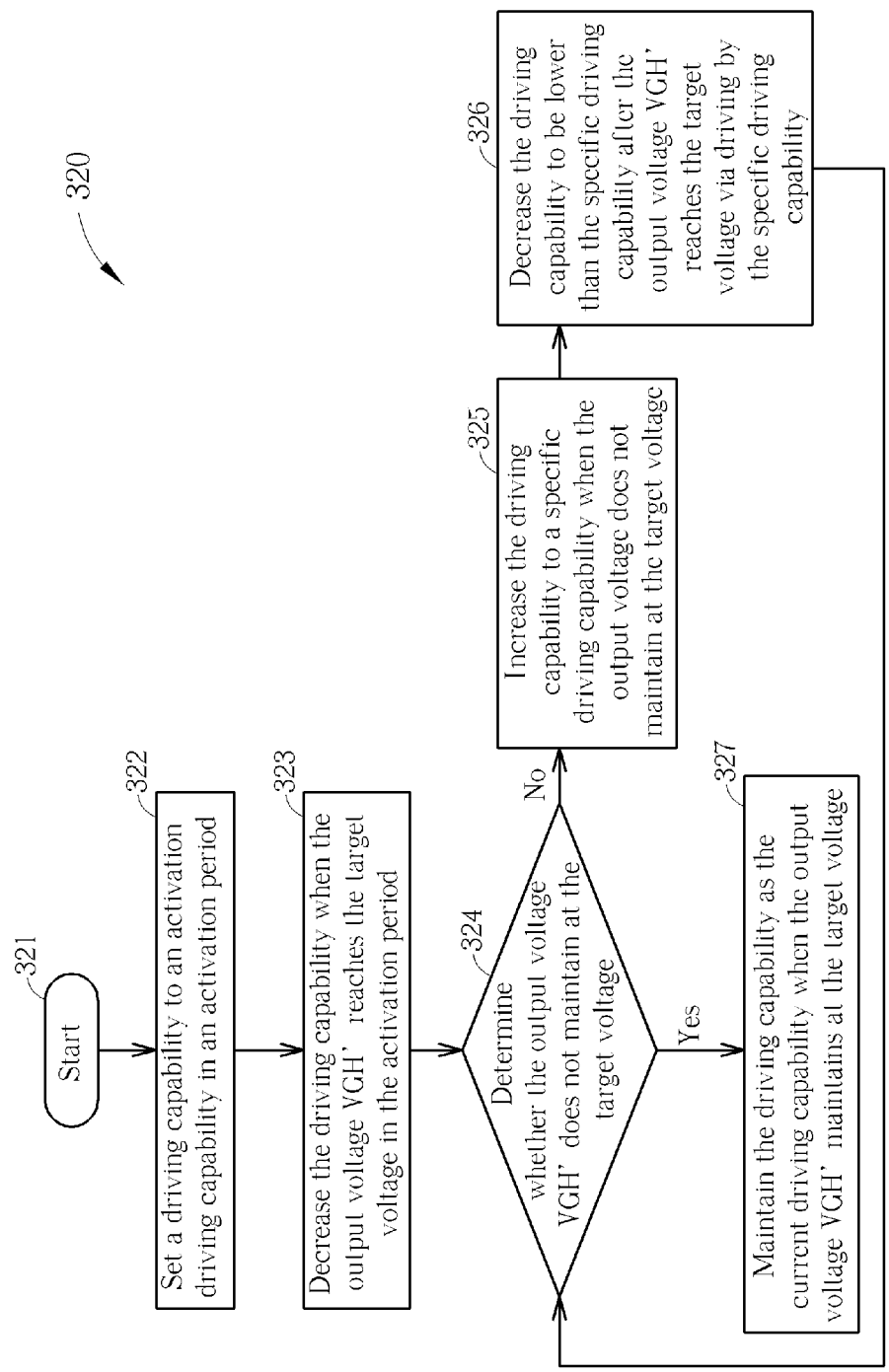
FIG. 3B is a schematic diagram of a driving capability adjustment method according to an embodiment of the present invention.

As to the detained operations of the charge pump device 30 shown in FIG. 3A, please refer to FIG. 3B, which is a schematic diagram of a driving capability adjustment method 320 according to an embodiment of the present invention. The driving capability adjustment method 320 comprises:

Step 321: Start.

Step 322: Set a driving capability to a startup driving capability in a startup period.

Step 323: Decrease the driving capability when the output voltage VGH' reaches the target voltage in the startup period.

Step 324: Determine whether the output voltage VGH' does not maintain at the target voltage. If no, go to the step 325; otherwise, go to the step 327.

Step 325: Increase the driving capability to a specific driving capability when the output voltage does not maintain at the target voltage.

Step 326: Decrease the driving capability to be lower than the specific driving capability after the output voltage VGH' reaches the target voltage via driving by the specific driving capability.

Step 327: Maintain the driving capability as the current driving capability when the output voltage VGH' maintains at the target voltage.

The driving capability adjustment method 320 can be divided into the startup period and the operation period. Simply speaking, in the startup period, the driving capability circuit 310 sets the driving capability according to whether the output voltage VGH' of a charge pump device 30 reaches the target voltage for driving the charge pump device (the steps 322, 323). Next, the following steps are repeatedly executed in the operation period after the startup period: (i) set the driving capability according to whether the output voltage VGH' does not maintain at the target voltage (the steps 324, 325, 327), and (ii) set the driving capability according to whether the output voltage VGH' reaches the target voltage (the step 326).

In detail, in the startup period, the driving capability is set to be the startup driving capability such as the strongest driving capability among a plurality of driving capabilities (the step 322). Next, the driving capability is decreased when the output voltage VGH' reaches the target voltage (ex. the driving capability is decreased to the weakest driving capability of the plurality of driving capabilities) (step 323).

Next, in the operation period, the driving capability adjustment method 320 firstly determines whether the output voltage VGH' does not maintain at the target voltage. If the output voltage VGH' does not maintain at the target voltage, the driving capability is set to be the specific driving capability, such as the strongest driving capability among the plurality of driving capabilities (Step 325). After the output voltage VGH' reaches the target voltage via driving by the specific driving capability, the driving capability is decreased to be lower than the specific driving capability (Step 326), wherein the decreased driving capability is preferably determined according to the number of times the output voltage VGH' has not maintained at the target voltage. The driving capability can be set stronger when the number of times the output voltage VGH' has not maintained at the target voltage is larger. For example, when the number of times the output voltage VGH' has not maintained at the target voltage is one, the driving capability can be a second weakest driving capability among the plurality of driving capabilities, which is stronger than the weakest driving capability, and so on. On the other hand, if the output voltage VGH' maintains at the target voltage, the driving capability can be maintained at the current driving capability, i.e. the driving exactly affords the current loading (Step 327).

As can be seen from the above, when the charge pump device 30 starts operating, i.e. in the startup period, the driving capability control circuit 310 firstly set the driving capability to the startup driving capability, such as the strongest driving capability among the plurality of the driving capabilities, for allowing the output voltage VGH' to reach the target voltage. Next, since the number of times the output voltage VGH' has not maintained at the target voltage is zero, the driving capability control circuit 310 decreases the driving capability to the weakest driving capability among the plurality of driving capabilities provided by the driving stage 302. Then, in the operation period, if the weakest driving capability cannot maintain the output voltage VGH' at the target voltage, the driving capability control circuit 310 sets the driving capability to the specific driving capability again, such that the output voltage VGH' reaches the target voltage. Since the number of times the output voltage has not maintained at the target voltage becomes one, the driving capability control circuit 310 decreases the driving capability to the second weakest driving capability among the plurality of driving capabilities provided by the driving stage 302, and so on. In the end, the driving capability control circuit 310 can set the driving capability to the minimum requirement to maintain the output voltage VGH' at a certain loading. As a result, the charge pump device 30 can output the output voltage VGH' with minimum ripples and capable of affording the current loading.

Figure 1A:
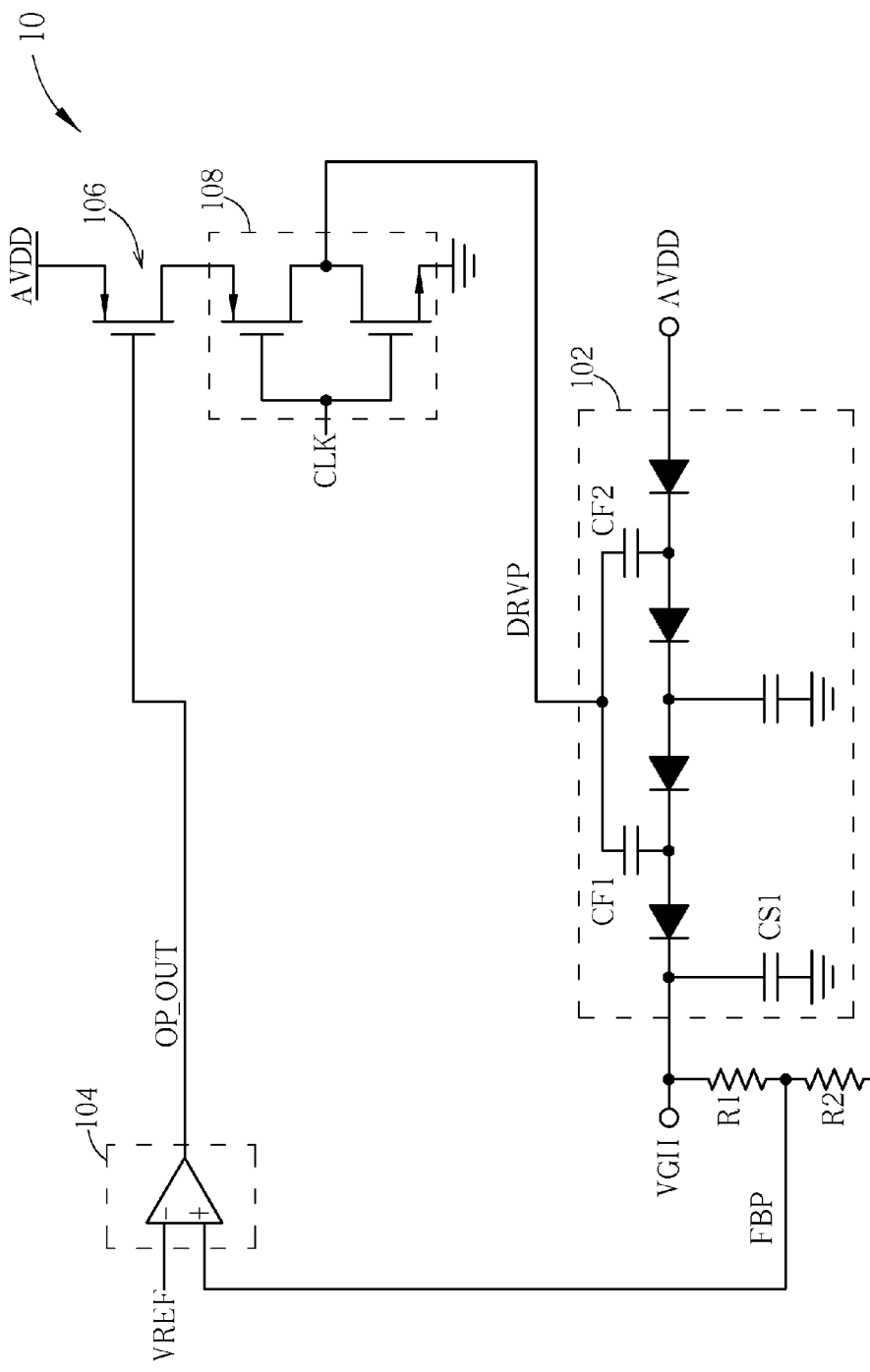
FIG. 1A is a schematic diagram of a conventional charge pump device.
Figure 1B:
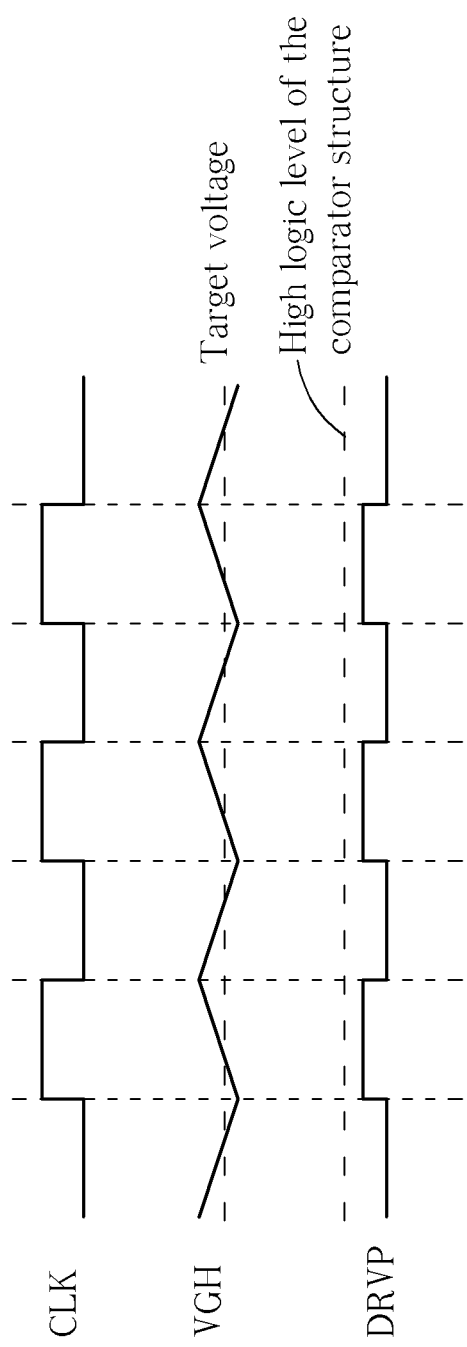
FIG. 1B is a waveform diagram of related signals of the charge pump device shown in FIG. 1A.
Figure 2A:
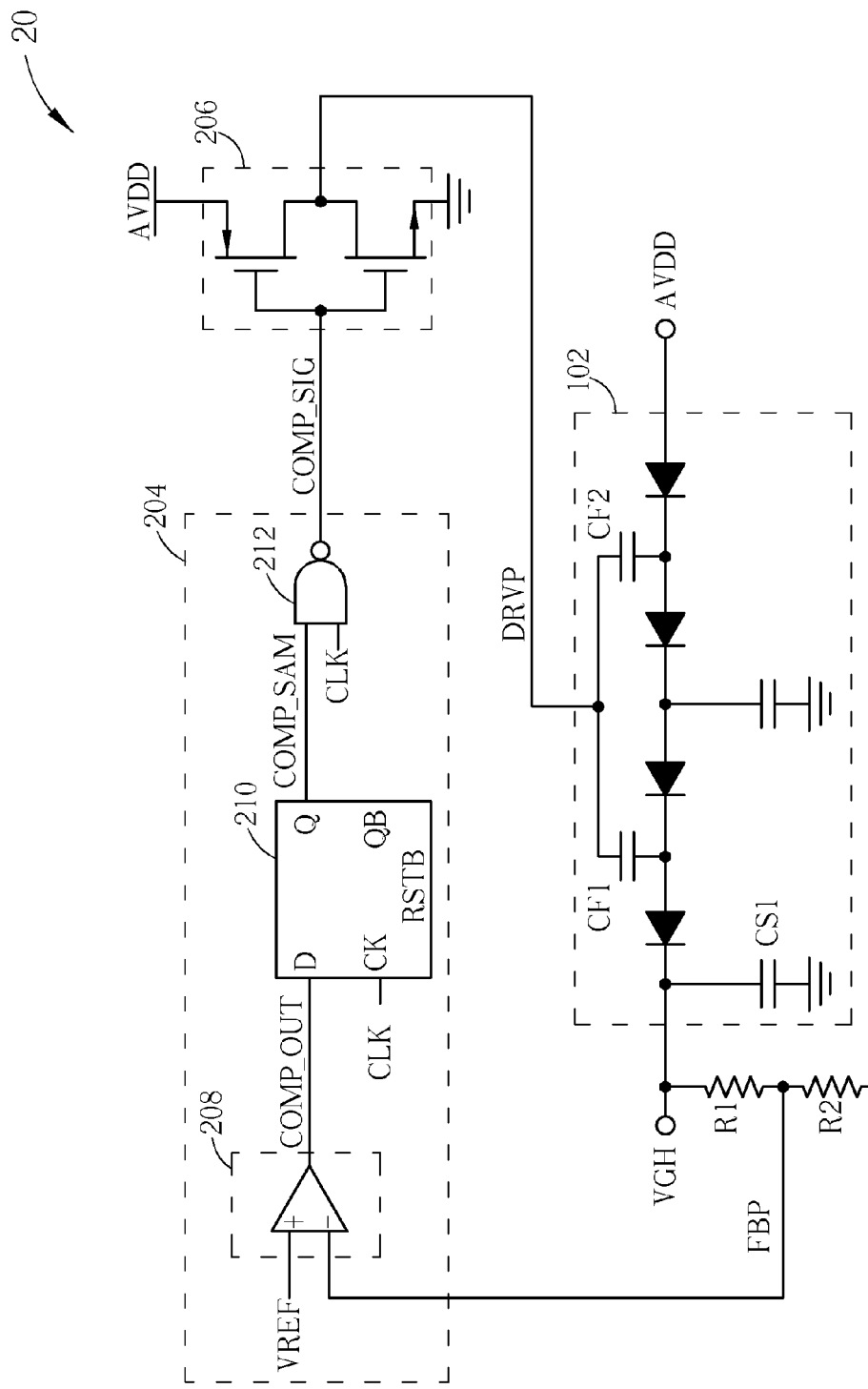
FIG. 2A is a schematic diagram of another conventional charge pump device.
Figure 2B:
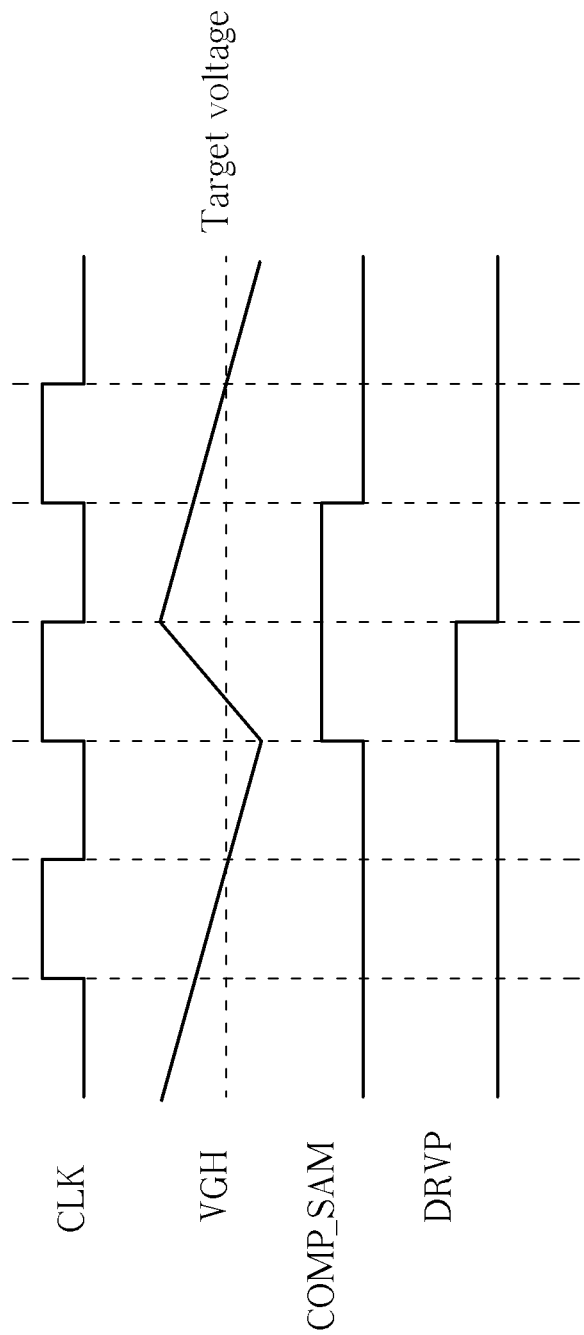
FIG. 2B is a waveform diagram of related signals of the charge pump device shown in FIG. 2A.
Figure 4A:
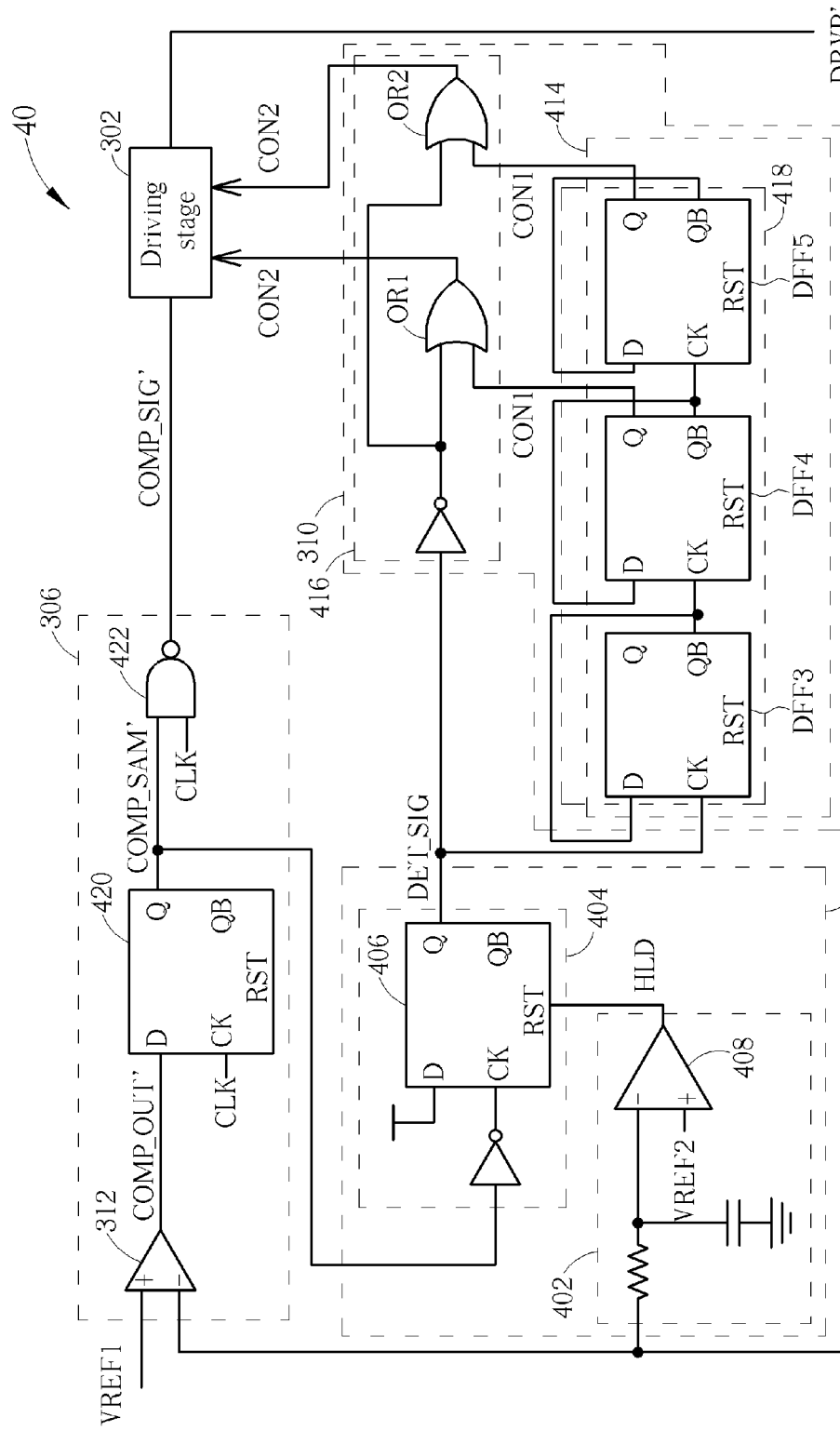
FIG. 4A-4D are schematic diagrams of implementation methods for realizing the charge pump circuit of the charge pump device shown in FIG. 3A according to different embodiments.
Figure 4B:
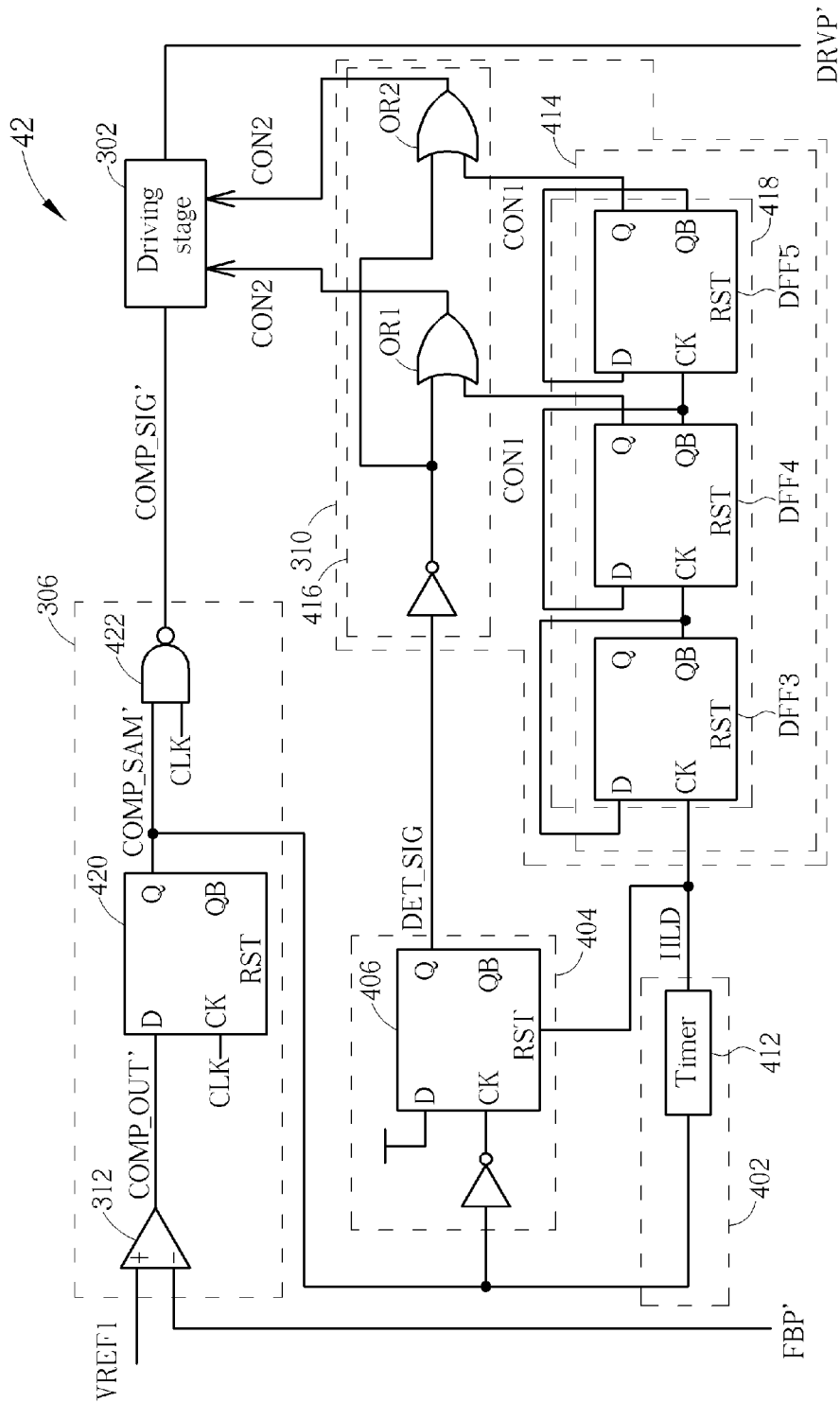

As to the detailed structures of all circuit of the charge pump device 30, please refer to FIG. 4A and FIG. 4B, which are schematic diagrams of the detailed structures of charge pump device 40 and 42 according to different embodiments of the charge pump device 30 shown in FIG. 3A, respectively. As shown in FIG. 4A, the overload detection circuit 308 comprises an overload detection unit 402 and a level switching unit 404. The overload detection unit 402 comprises a first input terminal coupled to the output terminal of the charge pump circuit 304 (the output voltage VGH' generates a feedback voltage FBP' through the voltage dividing resistor R1 and R2 shown in FIG. 2A), and a first detection output terminal. The overload detection circuit 402 is configured for generating an overload signal HLD by determining whether the output voltage VGH' does not maintain at the target voltage according to the output voltage VGH'. The level switching 404 is configured for detecting specific edges of the comparing signal COMP_OUT' to switch the detection signal DET_SIG to a first status (high logic level), and switching the detection signal DET_SIG to a second status according to the overload signal HLD. In other words, the detection result DET provided by the overload detection circuit 308 includes the detection signal DET_SIG in this embodiment.

As to the detailed structures of each of the overload detection unit 402 and the level switching unit 404, please refer to FIG. 4A, in which the overload detection unit 402 can comprise a low-pass filter and a comparator 408. The comparator 408 comprises two input terminals, one of which is the first input terminal of the overload detection unit 402 and the other of which is coupled to a reference voltage VREF2 that is lower than the reference voltage VREF1, and the comparator 408 further comprises an output terminal used as the first detection output terminal. The comparator 408 therefore generates a comparing signal to be used as the overload signal HLD according to the output voltage VGH' and the reference voltage VREF2 (the low-pass filter filters the dividing voltage of the output voltage VGH', i.e. the feedback voltage FBP', to the comparator 408 for performing comparing, to reduce noise interferences). In other words, the comparator 408 generates the comparing signal as the overload signal HLD according to whether the output voltage VGH' is much lower than the target voltage, to indicate whether the output voltage VGH' does not maintain at the target voltage. On the other hand, the level switching unit 404 can comprise a flip-flop 406 comprising a clock input terminal coupled to the output terminal of the comparing circuit 306 (the comparing signal COMP_OUT'), a reset terminal RST coupled to the first detection output terminal for receiving the overload signal HLD, a data input terminal coupled to a fixed voltage level, and a data output terminal used as a second detection output terminal of the overload detection circuit 308 for generating the detection signal DET_SIG.

In such a configuration, the detection signal DET_SIG is switched to the high logic level when the specific edges of the comparing signal COMP_OUT' switch is detected to transition from the high logic level to the low logic level (i.e. the output voltage VGH' reaches the target voltage). Next, the overload signal HLD is switched to the high logic level when the overload detection unit 402 determines the output voltage VGH' does not maintain at the target voltage according to the output voltage VGH', to reset the flip-flop 406 (the flip-flop 406 is reset when the reset terminal RST is at the high logic level), such that the detection signal DET_SIG is switched to the low logic level. As a result, the detection signal DET_SIG indicates the output voltage VGH' maintains at the target voltage when the detection signal DET_SIG is at the high logic level. Besides, the number of times the detection signal DET_SIG is switched from the high logic level to the low logic level can also indicate the number of times the output voltage VGH' has not maintained at the target voltage.

Noticeably, the overload detection unit 402 and the level switching unit 404 shown in FIG. 4A is one of the embodiments. In other embodiments, such as the embodiment shown in FIG. 4B, the first input terminal of the overload detection unit 402 can be coupled to the output terminal of the comparing circuit 306. The overload detection unit 402 then determines whether the output voltage VGH' does not maintain at the target voltage according to a comparing signal COMP_OUT', to generate an overload signal HLD at a first detection output terminal. In addition, the detection result DET not only comprises the detection signal DET_SIG, but further comprises the overload signal HLD. In other words, the detection signal DET_SIG is provided to the driving capability control unit 310 for determining whether the output voltage VGH' reaches the target voltage, and the overload signal HLD is provided to the driving capability control circuit 310 for determining whether the output voltage VGH' does not maintain at the target voltage.

Moreover, as to the detailed structure of the overload detection unit 402 of the embodiment shown in FIG. 4B, the overload detection unit 402 may comprise a timer 412 comprising an input terminal coupled to the output terminal of the comparator 312 and an output terminal as the first detection output terminal. The timer 412 therefore detects whether the comparing signal COMP_OUT' maintains at a specific level (high logic level) for a specific time, to generate the overload signal HLD. In other words, the timer 412 generates the overload signal HLD according to whether the comparing signal COMP_OUT' maintains at the high logic level for a long period (i.e. the output voltage VGH' does not reach the target voltage for a lone period), to indicate whether the output voltage VGH' does not maintain at the target voltage.

Therefore, in such a configuration, the detection signal DET_SIG is switched to the high logic level when the specific edges of the comparing signal COMP_OUT' is detected to transition from the high logic level to the low logic level. Next, the overload signal HLD is switched to the high logic level when the overload detection unit 402 determines the output voltage VGH' does not maintain at the target voltage according to the output voltage VGH', to switch the overload signal HLD for resetting the flip-flop 406 (the flip-flop 406 is reset when the reset terminal RST of the flip-flop 406 is at the high logic level) such that the detection signal DET_SIG is switched to low logic level. As a result, the detection signal DET_SIG indicates the output voltage VGH' maintains at the target voltage when the detection signal DET_SIG is at the high logic level, and the number of times the overload HLD is switched at the high logic level indicates the output voltage VGH' does not maintain at the target voltage. The other operations of the overload detection unit 402 and the level switching unit 404 shown in FIG. 4B are similar to those shown in FIG. 4A and can be referred to the above, and thus are not narrated herein for brevity.

Figure 4C:
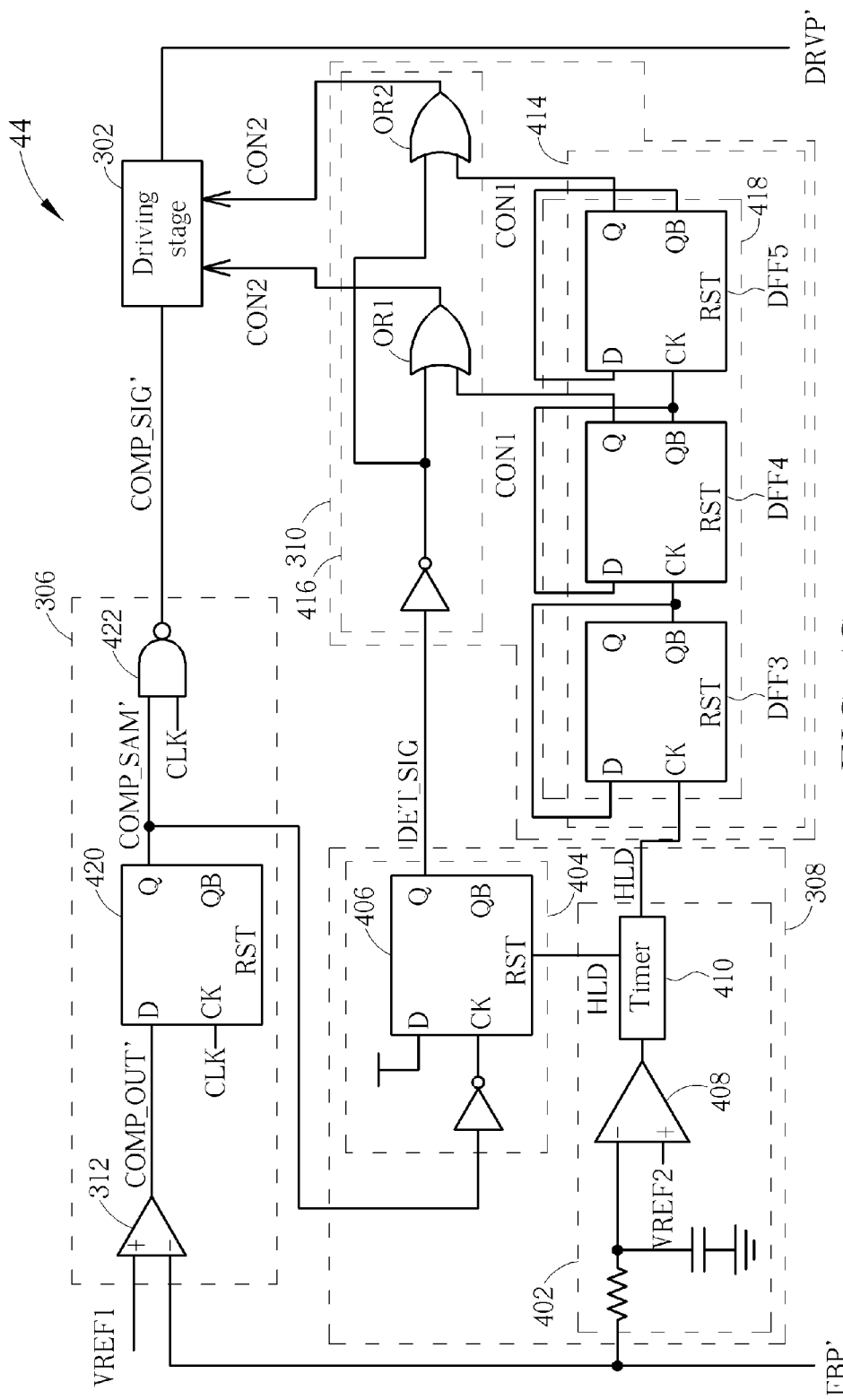
Figure 4D:
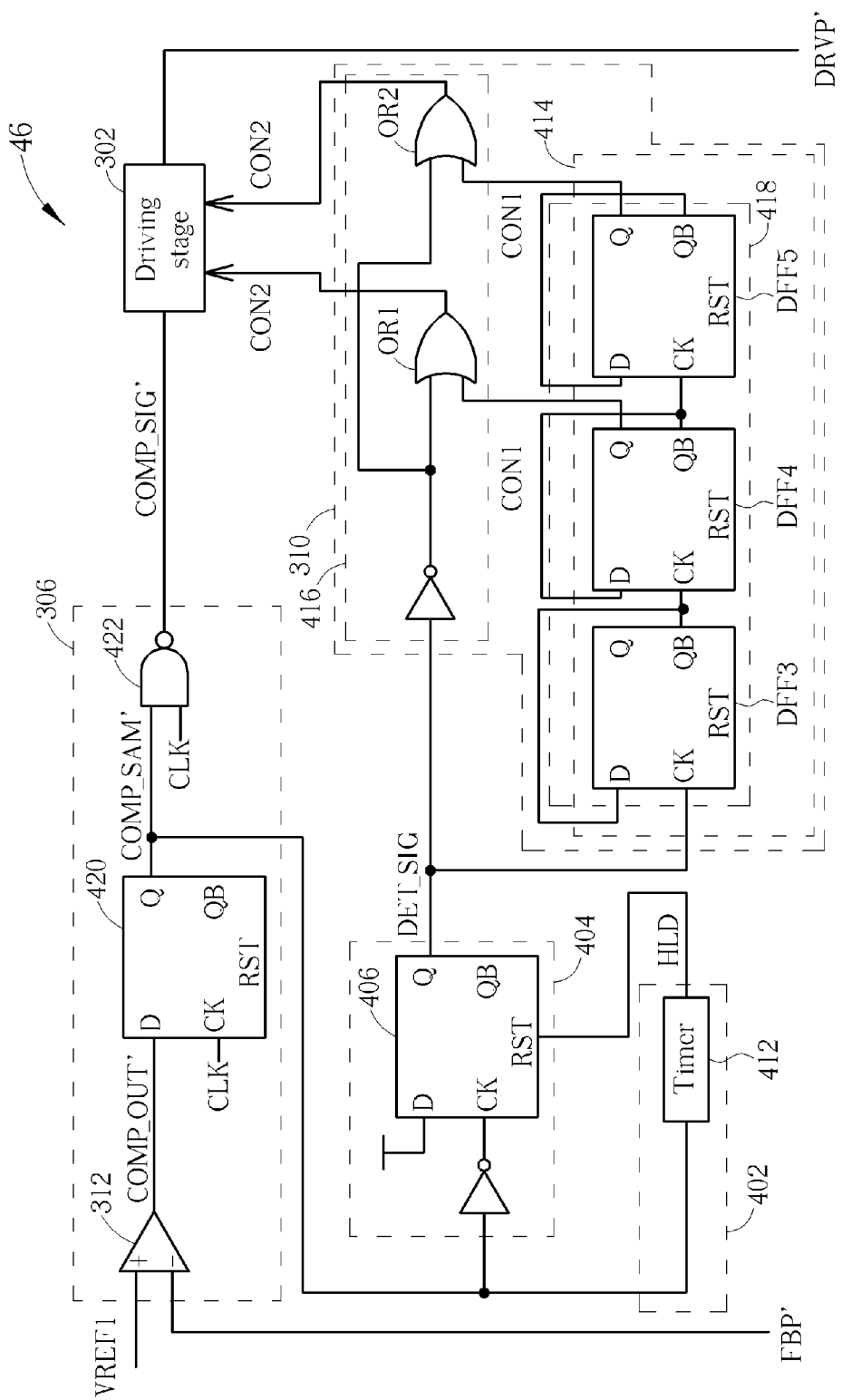

Please refer to FIG. 4C and FIG. 4D, which are schematic diagrams of charge pump device 44 and 46 according to alterations of the charge pump device 40 and 42 respectively shown in FIG. 4A and FIG. 4B. The overload signal HLD shown in FIG. 4C is outputted to the driving capability control circuit 310 for performing controlling, and is not limited to just output the detection signal DET_SIG to the driving capability control circuit 310 for performing controlling as shown in FIG. 4A. In other words, the similarity between FIG. 4C and FIG. 4B is that the detection result DET further comprises the overload signal HLD in addition to the detection signal DET_SIG.

In addition, in comparison with FIG. 4A, the overload detection unit 402 shown in FIG. 4C can further comprise a timer 410 comprising an input terminal coupled to the output terminal of the comparator 408 and an output terminal as the first detection output terminal. The timer 410 therefore detects whether the comparing signal generated by the comparator 408 maintains at a specific level for a specific period for generating the overload signal HLD. In such a condition, the timer 410 ensures that transitions of the overload signal HLD occur due to the output voltage VGH' actually much lower than the target voltage rather than interfered by noise. Note that, since both the timer 410 and the low-pass filter, which is consisted of resistors and capacitors and in front of the comparator 408, can reduce noise interference, the low-pass filer consisted of resistors and capacitors in front of the comparator 408 can be removed in other embodiments.

Noticeably, the overload signal HLD shown in FIG. 4B may not be outputted to the driving capability control circuit 310 for performing controlling in other embodiments, such as the embodiment shown in FIG. 4D, i.e. the main difference between FIG. 4D and FIG. 4B is the overload signal HLD shown in FIG. 4D is not outputted to the driving capability control circuit 310. In other words, the common characteristic between FIG. 4A and FIG. 4D is that the detection result only comprises the detection signal DET_SIG. Therefore, the driving capability control circuit 310 utilizes the detection signal DET_SIG for determining whether the output voltage VGH' reaches the target voltage and both whether the output voltage VGH' does not maintain at the target voltage.

On the other hand, please refer to FIG. 4A-4D for understanding the operations of the comparing circuit 306, the driving capability control circuit 310 and the driving stage 302. As to the comparing circuit 306, the architecture of the comparing circuit 306 shown in FIG. 4A-4D can be similar to that of the comparing circuit 204 shown in FIG. 2A, i.e. the comparing circuit 306 further comprises a flip-flop 420 and a NAND gate 422. The flip-flop 420 comprises a data input terminal D coupled the output terminal of the comparator 312, a clock terminal CK for receiving a clock signal CLK and a data output terminals Q. The NAND gate 422 comprises two input terminals respectively coupled to the data output terminal Q of the flip-flop 422 and the clock signal CLK, and an output terminal coupled to the driving stage 302. In such a structure, the flip-flop 420 can outputs the voltage level of the current comparing signal COMP_OUT' at the rising edge of the clock signal CLK for providing a comparing sample signal COMP_SAM' (i.e. the comparing sample signal COMP_SAM' maintains at the same level in a period of the clock signal CLK and is different from the comparing signal COMP_OUT' varying by noise and interference). The NAND gate 422 generates a comparing result signal COMP_SIG' to the driving stage 302 according to the comparing sample signal COMP_SAM' and the clock signal CLK.

On the other hand, the driving capability control circuit 310 can comprise a multi-level driving control unit 414 and a control output unit 416, for generating control signal CON1 corresponding to one of the plurality of driving capabilities provided by the driving stage 302. As can be seen from the above, the control input signal can be the detection signal DET_SIG (as shown in FIG. 4A and FIG. 4D) or the overload signal HLD (as shown in FIG. 4B and FIG. 4C). The control output unit 416 generates a control signal CON2 according to the detection signal DET_SIG and the control signal CON1, for controlling the driving capability corresponding to the driving signal DRVP' to be the one of the plurality of driving capabilities or a specific driving capability (i.e. the above mentioned driving capability adjusted according to the number of times the output voltage VGH' has not maintained at the target voltage or the strongest driving capability).

As to the detailed structure of each of the multi-level driving capability control unit 414 and control output unit 416, please refer to the embodiments shown in FIG. 4A-4D. The multi-level driving capability control unit 414 comprises a counter 418 comprising an input terminal coupled to the first or the second detection output terminal of the overload detection circuit 308 and a plurality of output terminals. The counter 418 therefore can count the number of transition times the control input signal (i.e. the overload signal HLD received from the first detection output terminal or the detection signal DET_SIG received from the second detection output terminal) transits from a second status to a first status, for generating the control signal CON1. On the other hand, the control output terminal 416 comprises a plurality of OR gates (such as OR gates OR1 and OR2), wherein each of the plurality of OR gates comprises an input terminal coupled to the second detection output terminal of the overload detection circuit 308, another input terminal coupled to one of the plurality of output terminals, and an output terminal coupled to the driving stage 302. The each of the plurality of OR gates therefore comprises an input terminal coupled to the detection signal DET_SIG (the second detection output terminal), another input terminal coupled to a portion of the control signal CON1, and an output terminal coupled to the driving stage 302 for outputting the calculation result.

In such a configuration, when the detection signal DET_SIG is at the low logic level for indicating that the output voltage VGH' does not maintain at the target voltage (ex. when start-up or when the overload detection signal HLD reset the flip-flop 406), the detection signal DET_SIG outputs a signal in the high logic level via an inverter, such that all the plurality of OR gates output the control signal CON2 in the high logic level. The driving stage 302 therefore accordingly uses the strongest driving capability for rapidly increasing the output voltage VGH' to the target voltage. Next, when the comparing signal COMP_OUT' is switched to low logic level such that the detection signal DET_SIG is switched to the high logic level for indicating that the output voltage VGH' reaches the target voltage, the detection signal DET_SIG outputs a signal in the low logic level via the inverter such that the plurality of OR gates generate the control signal CON2 according to the control signal CON1, where the control signal CON1 is generated according to the number of times the output voltage VGH' has not maintained at the target voltage (i.e. the number of transition times the overload signal HLD or the detection signal DET_SIG transits). For example, at transitions of the signal, the signal triggers the clock terminal of the flip-flop for changing the output result of the flip-flop as the control signal CON1.

For example, the counter 418 may comprise flip-flops DFF3-DFF5, wherein the control signal CON1 outputted by the flip-flops DFF4 and DFF5 is (0,0) after the first transition, the control signal CON1 outputted by the flip-flops DFF4 and DFF5 is (0,1) after the second transition, the control signal CON1 outputted by the flip-flops DFF4 and DFF5 is (1,0) after the fourth transition, and the control signal CON1 outputted by the flip-flops DFF4 and DFF5 is (1,1) after the sixth transition. As a result, the driving stage 302 controls the driving capability corresponding to the control driving signal DRVP' to be the one of the plurality of driving capability according to the number of times the output voltage VGH' does not maintain at the target voltage, and the driving capabilities becomes stronger when the number of times output voltage VGH' has not maintained at the target voltage becomes larger.

In the above configuration, the number of times the driving signal DRVP' drives the charge pump to perform continuous charging can be adjusted through the control signal CON2 by adjusting the number of times the comparing result signal COMP_SIG' is outputted to the driving stage, to adjust the driving capability corresponding to the driving signal DRVP'. Or, the number of times the comparing result signal COMP_SIG' is outputted to the driving stage 302 stays can be obtained the same, but the driving capability corresponding to the driving signal DRVP' can be adjusted through the control signal CON2 by adjusting the size of transistor generating the driving signal DRVP' in the driving stage 302 or adjusting the number of transistors connected in parallel for generating the driving signal DRVP' in the driving stage 302.

Noticeably, one of the at least one detection output terminal of the overland detection circuit 308 is coupled to the data output terminal of the flip-flop 420, to receive more stable comparing sample signal COMP_SAM' for performing detection in the embodiments shown in FIG. 4A-4D. However, in other embodiments, the one of the at least one detection output terminal of the overland detection circuit 308 may be coupled instead to the output terminal of the comparator 312, to directly receive the comparing signal COMP_OUT' for performing detection, though the comparing signal COMP_OUT' may vary due to noise and effect the detection result DET.

Note that, the main spirit of the above embodiments of the present invention is the overload detection circuit 308 can detect the comparing signal COMP_OUT' or the output voltage VGH' for generating the detection result DET to indicate whether the output voltage VGH' does not maintain at the target voltage and the number of times the output voltage VGH' has not maintained at the target voltage, such that the output voltage VGH' with minimum ripple and capable of exactly affording the current load can be obtained. Furthermore, since the control is performed by the comparator, there is no stability problem. Those skilled in the art can accordingly observe appropriate modifications and alternations, and are not limited herein. For example, the counter 418 may comprise two flip-flops for counting and two corresponding OR gates OR1 and OR2 for controlling the driving capability corresponding to the driving signal DRVP', and the number of the flip-flops and the corresponding OR gates can be another number and are not limited herein.

In the prior art, the output of the structure controlled by the operational amplifier has a pole varied with different external loadings and different output capacitors, causing concerns about instability. On the other hand, although the charge pump device controlled by the comparator is stable, the output thereof has greater output ripples, and the driving capability thereof may be insufficient for affording the loading if the output ripples are decreased via decreasing the driving capability of the driving signal. In comparison, the overload detection circuitry according to the above embodiments of the present invention detect the comparing signal or the output voltage to generate a detection result indicating whether the output voltage does not maintain at the target voltage and the number of times the output voltage has not maintained at the target voltage, thereby obtaining an output voltage with minimum ripple and capable of affording the current loading. Furthermore, the stability can be improved due to the output voltage controlled by the comparator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving capability adjustment method, for a charge pump device, comprising:
  setting a driving capability for driving the charge pump device according to whether an output voltage of the charge pump device reaches a target voltage in a startup period; and
  performing following procedure during an operation period after the startup period:
    (i) setting the driving capability according to whether the output voltage does not maintain at the target voltage;
    if the output voltage does not maintain at the target voltage, after the driving capability is set in step (i), then performing step (ii): setting the driving capability according to whether the output voltage reaches the target voltage; and if the output voltage reaches the target voltage, after the driving capability is set in step (ii), restart the procedure to perform step (i);

wherein the step (i) comprises:
setting the driving capability as a specific driving capability if the output voltage does not maintain at the target voltage;

wherein the step (ii) comprises:
decreasing the driving capability to be lower than the specific driving capability after utilizing the specific capability to drive the output voltage to reach the target voltage;
wherein a magnitude of the decreased driving capability is determined according to the number of previous times the output voltage has not maintained at the target voltage.

2. The driving capability adjustment method of claim 1, wherein the step of setting the driving capability for driving the charge pump device according to whether the output voltage of the charge pump device reaches the target voltage in the startup period comprises:
setting the driving capability be the strongest driving capability among a plurality of driving capabilities in the startup period.

3. The driving capability adjustment method of claim 2, wherein the step of setting the driving capability for driving the charge pump device according to whether the output voltage of the charge pump device reaches the target voltage in the startup period comprises:
decreasing the driving capability when the output voltage reaches the target voltage in the startup period.

4. The driving capability adjustment method of claim 3, wherein the step of setting the driving capability for driving the charge pump device according to whether the output voltage of the charge pump device reaches the target voltage in the startup period comprises:
decreasing the driving capability to the weakest driving capability among the plurality of driving capabilities in the startup period.

5. The driving capability adjustment method of claim 1, wherein the specific driving capability is a strongest driving capability among the plurality of driving capabilities.

6. The driving capability adjustment method of claim 1, wherein the step (i) comprises:
maintaining the driving capability as a current driving capability when the output voltage maintains at the target voltage.

7. The driving capability adjustment method of claim 1 further comprises:
setting the driving capability as a second weakest driving capability among the plurality of driving capabilities when the number of times the output voltage does not maintain at the target voltage is one.

8. The driving capability adjustment method of claim 1 further comprises:
setting the driving capability stronger if the number of times the output voltage does not maintain at the target voltage increases.

9. A driving capability adjustment method, for a charge pump device, comprising:
(i) utilizing a specific driving capability for driving to generate an output voltage when the output voltage does not maintain at a target voltage; and
(ii) utilizing a driving capability corresponding to the number of previous times the output voltage does not maintain at the target voltage for driving to generate the output voltage when the output voltage reaches the target voltage, wherein a magnitude of the driving capability is determined according to the number of previous times the output voltage has not maintained at the target voltage.

10. The driving capability adjustment method of claim 9, wherein the specific driving capability is the strongest driving capability among a plurality of driving capabilities.

11. The driving capability adjustment method of claim 9, wherein the driving capability becomes stronger if the number of times the output voltage does not maintain at the target voltage increases.

12. A driving capability adjustment method, for a charge pump device, comprising:
setting a driving capability to a strongest driving capability among a plurality of driving capabilities for driving the charge pump device in a startup period, wherein a number of the plurality of driving capabilities is greater than three when the driving operation is activated;
decreasing the driving capability to a weakest driving capability among the plurality of driving capabilities when the output voltage of the charge pump device reaches a target voltage in the startup period; and
performing following procedure during an operation period after the startup period:
(i) determining to set the driving capability to the strongest driving capability when the output voltage does not maintain at the target voltage and to maintain a current driving capability when the output voltage maintains at the target voltage; and
(ii) after the driving capability is set to the strongest driving capability, decreasing the driving capability to a driving capability when the output voltage reaches the target voltage; and
(iii) after the driving capability is decreased in step (ii), performing step (i);
wherein a magnitude of the decreased driving capability is determined according to the number of previous times the output voltage has not maintained at the target voltage.

* * * * *